United States Patent
Chen et al.

(10) Patent No.: US 11,914,265 B2
(45) Date of Patent: Feb. 27, 2024

(54) FOLDED WAVEGUIDE PHASE SHIFTERS

(71) Applicant: Taiwan Semiconductor Manufacturing Co., Ltd., Hsinchu (TW)

(72) Inventors: Huan-Neng Chen, Taichung (TW); Chewn-Pu Jou, Hsinchu (TW); Lan-Chou Cho, Hsinchu (TW); Feng-Wei Kuo, Zhudong Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 17/881,434

(22) Filed: Aug. 4, 2022

(65) Prior Publication Data

US 2022/0373854 A1    Nov. 24, 2022

Related U.S. Application Data

(63) Continuation of application No. 16/952,602, filed on Nov. 19, 2020, now Pat. No. 11,454,857, which is a continuation of application No. 16/532,270, filed on Aug. 5, 2019, now Pat. No. 10,845,670.

(60) Provisional application No. 62/719,558, filed on Aug. 17, 2018.

(51) Int. Cl.
| | | |
|---|---|---|
| G02F 1/025 | (2006.01) | |
| G02F 1/225 | (2006.01) | |
| G02F 1/017 | (2006.01) | |
| G02F 1/21 | (2006.01) | |

(52) U.S. Cl.
CPC ........ *G02F 1/2257* (2013.01); *G02F 1/01708* (2013.01); *G02F 1/025* (2013.01); *G02F 1/212* (2021.01); *G02F 2203/50* (2013.01)

(58) Field of Classification Search
CPC ...... G02F 1/01708; G02F 1/025; G02F 1/225; G02F 1/2257
See application file for complete search history.

(56) References Cited

U.S. PATENT DOCUMENTS

| | | | |
|---|---|---|---|
| 10,241,354 B1 | 3/2019 | Gill | |
| 10,505,031 B1 * | 12/2019 | Douglas | ............ H01L 29/41766 |
| 10,845,670 B2 | 11/2020 | Chen | |

(Continued)

FOREIGN PATENT DOCUMENTS

| | | |
|---|---|---|
| CN | 104393133 A | 3/2015 |
| CN | 105511120 A | 4/2016 |

(Continued)

OTHER PUBLICATIONS

Nedeljkovic, M. et al. "Free-carrier Electrorefraction and Electroabsorption Modulation Predictions for Silicon Over the 1-14 µm Infrared Wavelength Range", Photonics Journal, IEEE, Dec. 2011, 3(6):1171-1180.

*Primary Examiner* — Michael Stahl
(74) *Attorney, Agent, or Firm* — Duane Morris LLP

(57) ABSTRACT

In an embodiment, a phase shifter includes: a light input end; a light output end; a p-type semiconductor material, and an n-type semiconductor material contacting the p-type semiconductor material along a boundary area, wherein the boundary area is greater than a length from the light input end to the light output end multiplied by a core width of the phase shifter.

20 Claims, 12 Drawing Sheets

(56) References Cited

U.S. PATENT DOCUMENTS

| | | |
|---|---|---|
| 11,454,857 B2 * | 9/2022 | Chen .................... G02F 1/2257 |
| 2003/0052329 A1 | 3/2003 | Kobayashi |
| 2004/0160658 A1 | 8/2004 | Liu |
| 2005/0133859 A1 | 6/2005 | Kuwahara |
| 2005/0281525 A1 | 12/2005 | Samara-Rubio et al. |
| 2006/0008223 A1 | 1/2006 | Gunn |
| 2006/0045522 A1 | 3/2006 | Gill et al. |
| 2009/0263078 A1 | 10/2009 | Hosomi |
| 2011/0206384 A1 | 8/2011 | Zhou |
| 2012/0099813 A1 | 4/2012 | Lee |
| 2017/0023810 A1 | 1/2017 | Ogawa |
| 2017/0254955 A1 | 9/2017 | Poon et al. |
| 2017/0315421 A1 | 11/2017 | Popovic |
| 2018/0210242 A1 | 7/2018 | Baehr-Jones |

FOREIGN PATENT DOCUMENTS

| | | |
|---|---|---|
| CN | 106461986 A | 2/2017 |
| CN | 111736404 A * | 10/2020 |
| WO | WO 2016/150263 A1 * | 9/2016 |

* cited by examiner

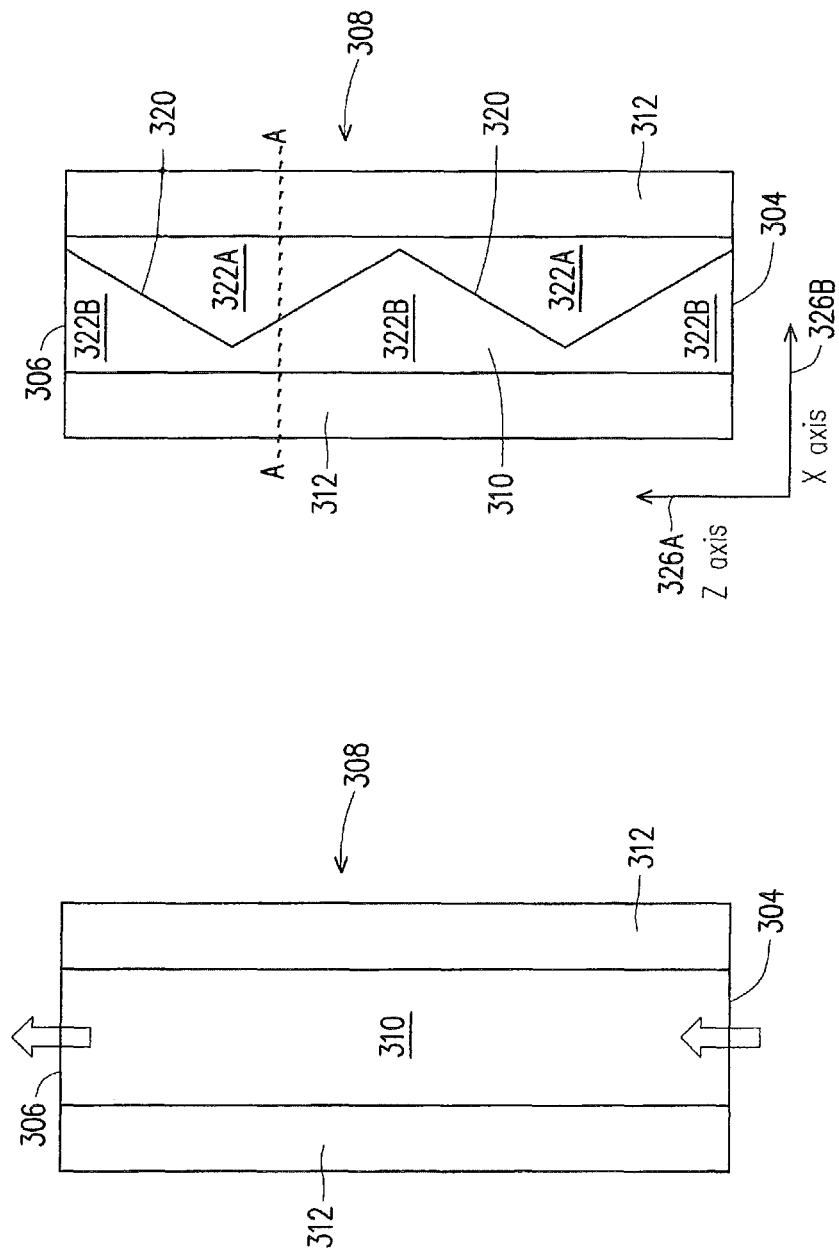

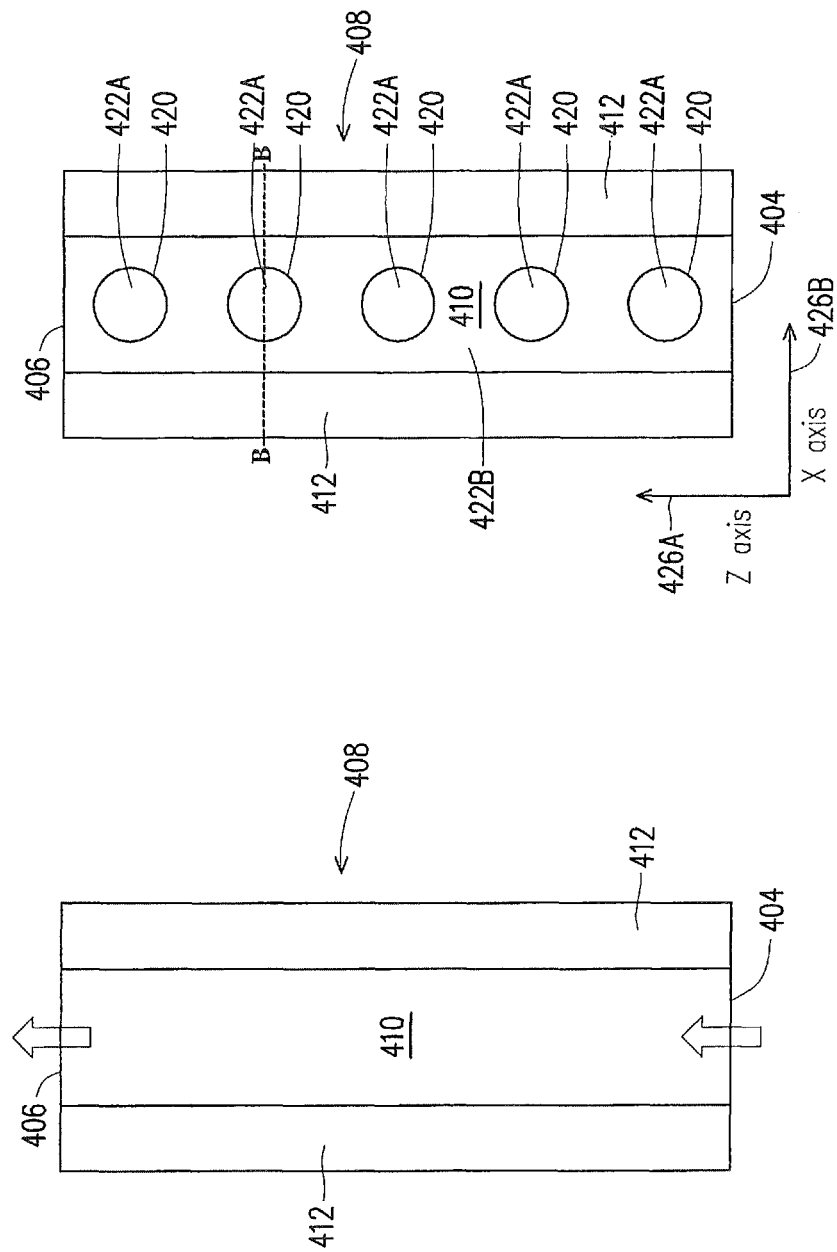

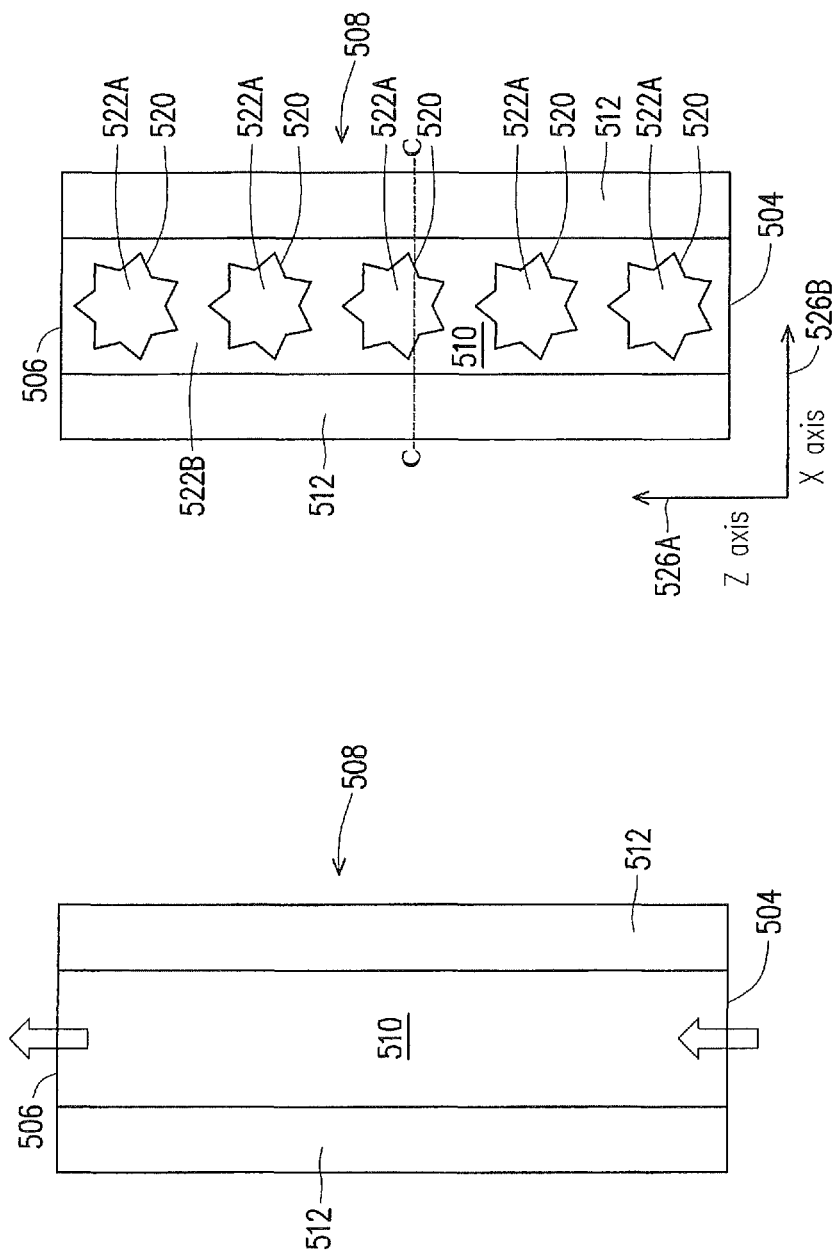

FOLDED WAVEGUIDE PHASE SHIFTERS

CROSS REFERENCE TO RELATED APPLICATIONS

This application is a continuation of U.S. patent application Ser. No. 16/952,602, filed Nov. 19, 2020, which is a continuation application of U.S. patent application Ser. No. 16/532,270 filed Aug. 5, 2019, now U.S. Pat. No. 10,845,670, which claims priority to U.S. provisional patent application Ser. No. 62/719,558 filed on Aug. 17, 2018, each of which are incorporated by reference herein.

BACKGROUND

Optical communications encode data by modulating a beam of light. This modulation may be, for example, upon the intensity or amplitude of the beam of light. This type of amplitude modulation may be achieved by combining a selectively delayed copy of a light beam with the light beam itself. For example, destructive interference may occur when the copy of the light beam is subjected to a phase delay of pi radians and combined with the original light beam itself. This destructive interference may yield minimum output intensity. However, constructive interference may occur when the copy of the light beam is subjected to no phase delay. Constructive interference may yield a maximum output intensity.

Phase delay may be controlled and/or implemented by a phase shifter. Typical phase shifters include an n-type semiconductor material contacting a p-type semiconductor material along a boundary area that is equal to a length from a light input end to a light output end multiplied by a width of the phase shifter. However, the effectiveness of such phase shifters may be limited by set parameters such as the width of the phase shifter and the length of the boundary from the light input end to the light output end. Therefore, traditional phase shifters may not be entirely satisfactory.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 3A illustrates a longitudinal cross sectional view of a light input end and a light output end of a folded waveguide phase shifter, in accordance with some embodiments.

FIG. 3B illustrates a longitudinal cross sectional view of a zig zag boundary area, in accordance with some embodiments.

FIG. 4A illustrates a longitudinal cross sectional view of a light input end and a light output end of a folded waveguide phase shifter, in accordance with some embodiment.

FIG. 4B illustrates a longitudinal cross sectional view of a circular boundary area, in accordance with some embodiments.

FIG. 5A illustrates a longitudinal cross sectional view of a light input end and a light output end of a folded waveguide phase shifter, in accordance with some embodiments.

FIG. 5B illustrates a longitudinal cross sectional view of a multi-pointed star boundary area, in accordance with some embodiment.

DETAILED DESCRIPTION OF EXEMPLARY EMBODIMENTS

Figure 1:
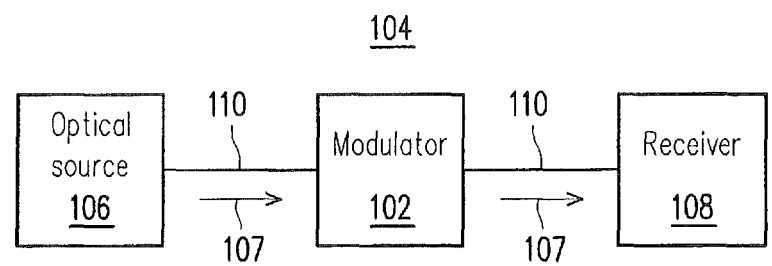
FIG. 1 is a block diagram of a modulator as part of a processing system, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and methods in accordance with various embodiments are directed to a folded waveguide phase shifter with an increased boundary area between p-type semiconductor materials and n-type semiconductor materials. This increased boundary area may be increased from merely having the boundary area be equal to a length from a light input end to a light output end multiplied by a core width of a waveguide phase shifter. Accordingly, the boundary area may be increased by including a pattern or fold to effectuate an increased boundary area. Stated another way, the boundary area may include at least one fold or nonlinear transition and not be present in only a straight line to effectuate an increased boundary area.

For example, the boundary area may be increased by adopting various two dimensional and/or three dimensional folds that make patterns for the boundary area. These patterns may include, for example, diagonals, triangles, arcs, circles, spheres, rectangles (e.g., blocks), squares, cylinders, and/or any other type of pattern that may be adopted to increase the boundary area between the n-type semiconductor material and the p-type semiconductor material. In particular embodiments, these patterns may form discrete shapes, such as circles or multi-pointed stars, from a light input end to a light output end of the waveguide.

In certain embodiments, the following equation may be utilized to express the relationship between a phase shift φ and an effective refractive index Δn in a waveguide:

$$\varphi = (2\pi/\lambda)\Delta n L$$

where λ is the optical wavelength and L is the interaction length or the length of the waveguide from the light input end to the light output end. Also, the effective refractive index Δn is directly related to the size of the boundary area between a p-type semiconductor material a n-type semiconductor material. Therefore, the amount of phase shift φ may be directly related to the size of the boundary area between a p-type semiconductor material a n-type semiconductor material within a waveguide. This means that as the boundary area is increased, the amount of phase shift may also be increased for the same interaction length L (e.g., length of the waveguide from the light input end to the light output end). Accordingly, an increased boundary area for a folded waveguide phase shifter may also increase the amount of phase shift φ without requiring additional length for the folded waveguide phase shifter.

In certain embodiments, the doping concentration for the p-type semiconductor material and the n-type semiconductor material may be substantially the same. In other embodiments, the doping of the p-type semiconductor material may be more than that of the n-type semiconductor material. For example, the doping of the p-type semiconductor material may be from about 2 to about 100 times more than that of the n-type semiconductor material. In yet other embodiments, the doping of the n-type semiconductor material may be more than that of the p-type semiconductor material. For example, the doping of the n-type semiconductor material may be from about 2 to about 100 times more than that of the p-type semiconductor material. In particular embodiments, the phase shifter may be implemented with a wave guide, such as with a Mach-Zehnder modulator and/or a ring modulator. In particular embodiments, the range of concentrations of P and N doping may be between about $1\times10^{16}$ atoms/cm$^3$ to about $1\times10^{21}$ atoms/cm$^3$. For example, in certain embodiments, the range of concentration of P and N doping may be about $1\times10^7$ atoms/cm$^3$ to about $1\times10^{18}$ atoms/cm$^3$. In certain embodiments, the P and N junctions may be side by side (e.g., adjacent). However, in other embodiments, the P and N junctions may be separated by about 10 nanometers to about 100 nanometers.

In further embodiments, a folded waveguide phase shifter may be from about 250 nanometers to about 2 micrometers in core width, from about 100 nanometers to about 500 nanometers in core height, and a variable length from a light input end to a light output end. For example, a folded waveguide phase shifter in certain embodiments may be from about 300 nanometers to about 500 nanometers in core width and from about 200 nanometers to about 300 nanometers in core height.

In various embodiments, a folded waveguide phase shifter may have a core that is built from a semiconductor material, such as a Group IV material such as silicon (Si) or germanium (Ge). In further embodiments, a folded waveguide phase shifter may have a core that is built from a Group III-V material such as like gallium arsenide (GaAs) or indium phosphide (InP). Cladding for a folded waveguide phase shifter may include dielectric materials such as silicon oxide (SiOx), germanium oxide (GeOx), silicon nitride (SiNx), or silicon-oxynitride (SiON). In certain embodiments, the effective index of cladding may be less than the effective index of the core.

FIG. 1 is a block diagram of a modulator 102 as part of a processing system 104, in accordance with some embodiments. More specifically, FIG. 1 illustrates how an optical source 106 may transmit a light beam to the modulator 102 with which the light beam 107 is modulated and received by the receiver 108. Each component (e.g., optical source 106, modulator 102, and receiver 108) may be connected by an optical fiber or optical conduit 110. In certain embodiments, the optical source 106 may be a laser and the light beam 107 a laser beam. In particular embodiments, the optical conduits 110 may include for example optical fibers, optical waveguides, free space or other suitable optical conduits.

The processing system 104 may be part of the internal components of a computer system. For example, the processing system 104 may be part of, for example, a personal or laptop computer, with the modulator 102 included in a processor of the processing system 104 and receiver 108 included in, for example, an internal card of the processing system 104, such as for example a video controller card, a network interface card, memory or the like. In another embodiment, the processing system 104 may be included in a single chip or chipset with the optical source 106 and receiver 108 being internal components of the chip or chipset. In another embodiment, the processing system 104 may be included in a communications network with optical source 106 and receiver 108 being included in separate components of the communications network.

As will be discussed in further detail below, the modulator 102 may include a folded waveguide phase shifter with an increased boundary area between p-type semiconductor materials and n-type semiconductor materials. For example, the boundary area may be increased by adopting various two dimensional and/or three dimensional folds that make patterns for the boundary. These patterns may include, for example, diagonals, triangles, arcs, rectangles (e.g., blocks), squares, circles, spheres, cylinders, and/or any other type of pattern that may be adopted to increase the boundary area between the n-type semiconductor material and the p-type semiconductor material. In particular embodiments, these patterns may form discrete shapes from a light input end to a light output end of the waveguide.

Figure 2A:
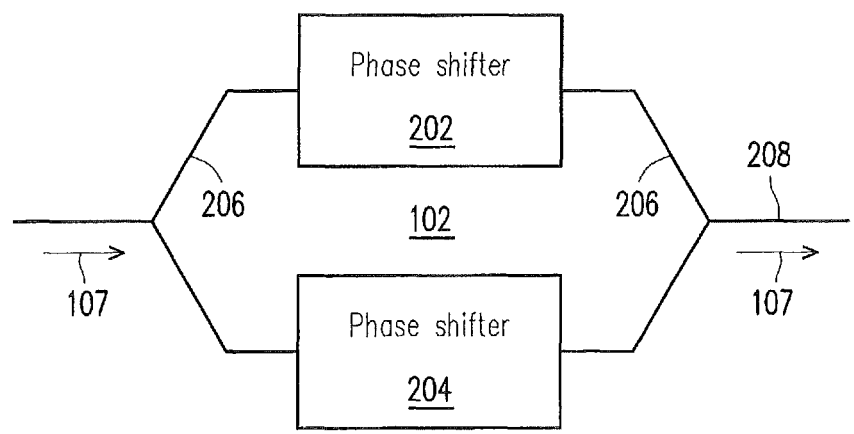
FIG. 2A is a block diagram of the modulator that utilizes a folded waveguide phase shifter, in accordance with some embodiments.

FIG. 2A is a block diagram of the modulator 102 that utilizes a folded waveguide phase shifter 202, in accordance with some embodiments. The modulator 102 may include least one of two arms optically coupled between cascaded Y-branch couplers 206 disposed in semiconductor material.

In operation, the light beam 107 is split such that a first portion of the light beam 107 is directed through one of the arms of the cascaded Y-branch couplers 206 and a second portion of light beam 107 is directed through the other one of the arms of the cascaded Y-branch couplers 206. One of the arms of the cascaded Y-branch couplers 206 includes the folded waveguide phase shifter 202, which performs a phase shift. The first and second portions of the light beam 107 are then merged such that the light beam 107 is modulated at the output 208 as a result of constructive or destructive interference.

In one embodiment, only one of the arms of the cascaded Y-branch couplers 206 includes the folded waveguide phase shifter 202. In another embodiment, both of the arms of the cascaded Y-branch couplers 206 may include different the folded waveguide phase shifters, such as different folded waveguide phase shifters with different boundary areas. For example, one of the arms of the cascaded Y-branch couplers 206 includes the folded waveguide phase shifter 202 with the other arm including another folded waveguide phase shifter 204.

Figure 2B:
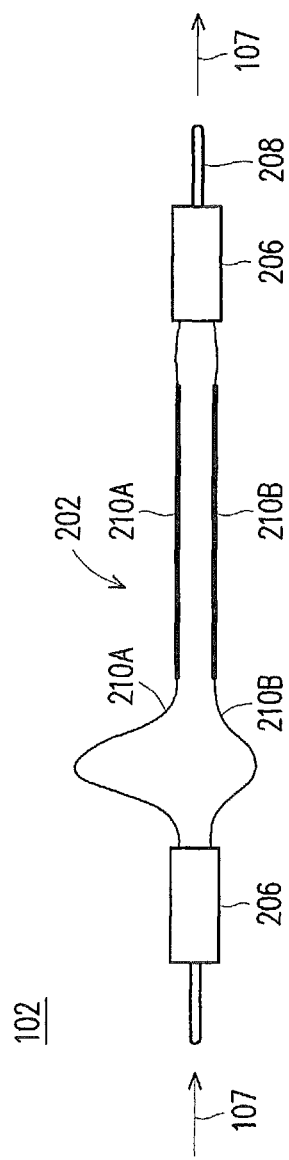
FIG. 2B is a diagram of the modulator illustrated as a Mach-Zehnder modulator that utilizes a folded waveguide phase shifter, in accordance with some embodiments.

FIG. 2B is a diagram of the modulator 102 illustrated as a Mach-Zehnder modulator that utilizes a folded waveguide phase shifter, in accordance with some embodiments. The modulator 102 may include least one of two arms optically coupled between cascaded Y-branch couplers 206 disposed in semiconductor material. In operation, the light beam 107 is split such that a first portion of the light beam 107 is directed through a first arm 210A of the cascaded Y-branch couplers 206 and a second portion of light beam 107 is directed through a second arm 210B of the cascaded Y-branch couplers 206. Both of the first arm 210A, and second arm 210B include the folded waveguide phase shifter 202, which performs a phase shift. However, the first arm 210A may longer than the second arm 210B. The first and second portions of the light beam 107 are then merged such that the light beam 107 is modulated at the output 208 as a result of constructive or destructive interference.

Figure 2C:
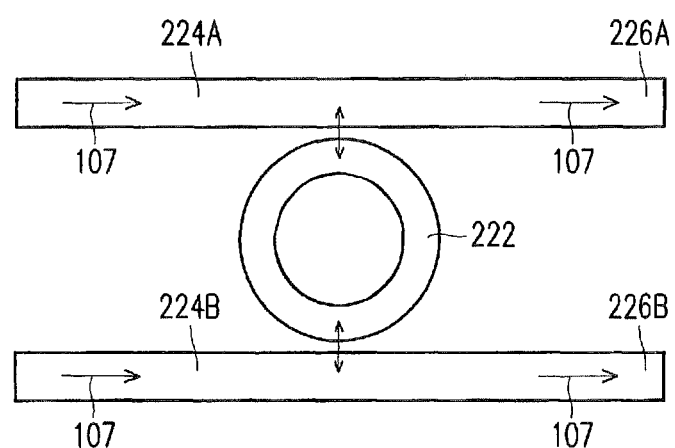
FIG. 2C is a block diagram of a ring modulator that utilizes a folded waveguide phase shifter in the shape of a ring, in accordance with some embodiments.

FIG. 2C is a block diagram of a ring modulator 220 that utilizes a folded waveguide phase shifter 222 in the shape of a ring, in accordance with some embodiments. Stated another way, the ring modulator 220 may implement the folded waveguide phase shifter 222 in the shape of a ring. The ring modulator 220 may include, for example, two waveguides 224A, 224B which may each receive a respective light beam 107. The light beam may transition from each respective waveguide 224A, 224B into and from the folded waveguide phase shifter 222 in the shape of a ring as an evanescent wave. The portions of the light beam in each respective waveguide 224A, 224B may be merged with the portions of the light beam that propagated through the folded waveguide phase shifter 222 to be modulated at the respective outputs 226A, 226B as a result of constructive or destructive interference. The operation of the ring modulator 220 may be implemented in a conventional manner aside from the utilization of the folded waveguide phase shifter 222. Therefore, further discussion of the operation of the ring modulator 220 will not be discussed herein for brevity.

FIG. 3A illustrates a longitudinal cross sectional view of a light input end 304 and a light output end 306 of a folded waveguide phase shifter 308, in accordance with some embodiments. The longitudinal cross sectional view, as a longitudinal cross section, may span from the light input end 304 to the light output end 306. The folded waveguide phase shifter 308 may include a core 310 and a cladding 312. The core 310 may be the part of the folded waveguide phase shifter 308 in which light may propagate through from the light input end 304 to the light output end 306. In certain embodiments, the core portion may be made of silicon while the cladding portion may be made of silicon oxide. However, the core portion and the cladding portion may be made of other materials as desired for different applications, in various embodiments. For example, the core portion may be made from a semiconductor material, such as a Group IV material such as silicon (Si) or germanium (Ge) and/or a Group III-V material such as like gallium arsenide (GaAs) or indium phosphide (InP). The cladding portion may include dielectric materials such as silicon oxide (SiOx), germanium oxide (GeOx), silicon nitride (SiNx), or silicon-oxynitride (SiON). In certain embodiments, the effective index of cladding may be less than the effective index of the core.

FIG. 3B illustrates a longitudinal cross sectional view of a zig zag boundary area 320, in accordance with some embodiments. The boundary area 320 may be between a first type of semiconductor material 322A and a second type of semiconductor material 322B. In certain embodiments, the first type of semiconductor material 322A may be a p-type semiconductor material while the second type of semiconductor material 322B may be an n-type semiconductor material. However, in other embodiments, the first type of semiconductor material 322A may be an n-type semiconductor material while the second type of semiconductor material 322B may be a p-type semiconductor material.

The zig zag boundary area 320 may be greater than a length of the folded waveguide phase shifter 308 along an extension axis 326A (e.g., an axis along which the light substantially propagates from a light input end to a light output end) multiplied by a core width of the core 310 along any possible perpendicular axes (e.g., an axis perpendicular to the extension axis that may be combined with the extension axis to form an area). In certain embodiments with two core widths along respective axes, one of the core widths along one axis perpendicular to the extension axis may be referred to as a core width while the other of the core widths along another axis perpendicular to the extension axis may be referred to as a core height. The extension axis may also be referenced as a Z axis. When the core 310 of the folded waveguide phase shifter 308 is in the shape of a rectangular bar, the perpendicular axis may be broken up into a first perpendicular axis 326B (e.g., referenced as an X axis) and a second perpendicular axis (e.g., referenced as a Y axis). When the core 310 of the folded waveguide phase shifter 308 is in the shape of a cylinder, the perpendicular axis or may be along a diameter perpendicular to the extension axis 326A.

For example, the zig zag boundary area 320 may extend fully along the extension axis 326A and extend fully several times along the second perpendicular axis 326C within the core 310, thus forming a zigzag line. This zigzag line would be longer than the core 310 of the folded waveguide phase shifter 308 along the length of the extension axis. Also, the zig zag boundary area 320 may extend clear across the core 310 along a core width from one side of the core 310 to another side of the core 310. Accordingly, at least for a same core width along any possible perpendicular axes, the zig zag boundary area 320 that at least extends along the zig zag line would be greater than a length of the folded waveguide phase shifter 308 along the extension axis 326A (e.g., as a straight line) multiplied by a core width along any perpendicular axes (e.g., as a straight line).

Figure 3C:
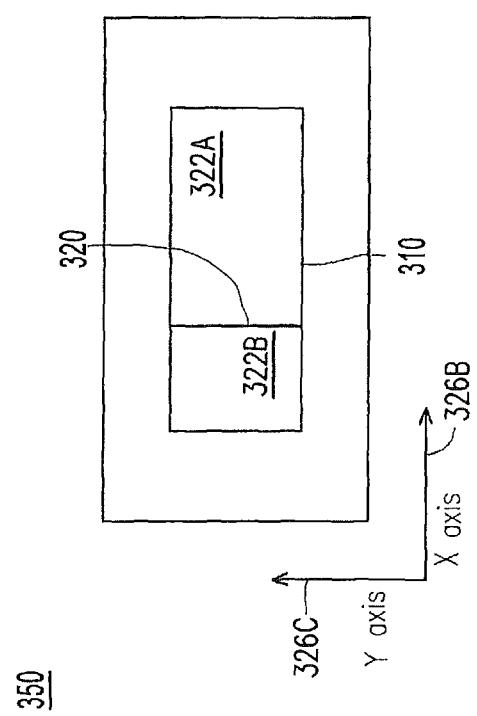
FIG. 3C illustrates a lateral cross sectional view of the zig zag boundary area across line A-A of FIG. 3B, in accordance with some embodiments.

FIG. 3C illustrates a lateral cross sectional view 350 of the zig zag boundary area across line A-A of FIG. 3B, in accordance with some embodiments. The lateral cross sectional view 350 may be of a cross section that would not include the light input end and/or the light output end. Stated another way, the lateral cross sectional view 350 may be a view perpendicular to a longitudinal cross sectional view. As noted above, the zig zag boundary area 320 may be greater than a length of the folded waveguide phase shifter 308 along the extension axis multiplied by a core width of the core 310 along any possible perpendicular axes. The possible perpendicular axes may include the first perpendicular axis 326B (e.g., referenced as an X axis) and a second perpendicular axis 326C (e.g., referenced as a Y axis). In certain embodiments with two core widths along respective axes, one of the core widths along one axis perpendicular to the extension axis may be referred to as a core width while the other of the core widths along another axis perpendicular to the extension axis may be referred to as a core height. Also, the zig zag boundary area 320 may extend fully along the extension axis and extend fully along the second perpendicular axis 326C within the core 310, thus forming a zig zag line. Accordingly, the zig zag boundary area 320 would be greater than a length of the folded waveguide phase shifter 308 along the extension axis 326A (e.g., as a straight line) multiplied by a core width along any perpendicular axes (e.g., as a straight line).

Figure 3D:
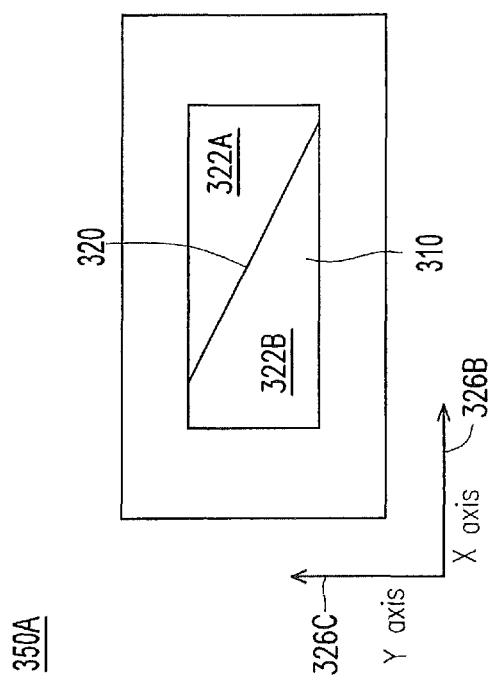
FIG. 3D illustrates an alternate lateral cross sectional view of the zig zag boundary area, in accordance with some embodiments.

FIG. 3D illustrates an alternate lateral cross sectional view 350A of the zig zag boundary area, in accordance with some embodiments. The alternate lateral cross sectional view 350A illustrates an alternate cross sectional structure (e.g., in a cross sectional view) relative to the cross sectional structure in the cross sectional view 350 of FIG. 3C. Returning to FIG. 3D, for example, the alternate lateral cross sectional view 350A may be of a cross section that would not include the light input end and/or the light output end. Stated another way, the alternate lateral cross sectional view 350A may be a view perpendicular to a longitudinal cross sectional view. As noted above, the zig zag boundary area 320 may be greater than a length of the folded waveguide phase shifter 308 along the extension axis multiplied by a core width of the core 310 along any possible perpendicular axes. The possible perpendicular axes may include the first perpendicular axis 326B (e.g., referenced as an X axis) and a second perpendicular axis 326C (e.g., referenced as a Y axis). In certain embodiments with two core widths along respective axes, one of the core widths along one axis perpendicular to the extension axis may be referred to as a core width while the other of the core widths along another axis perpendicular to the extension axis may be referred to as a core height. Also, the zig zag boundary area 320 may extend fully along the extension axis and extend fully along the second perpendicular axis 326C within the core 310, thus forming a zig zag line. More specifically, the zig zag boundary area 320 may extend across a diagonal or hypotenuse formed with the first perpendicular axis 326B and the second perpendicular axis 326C. This hypotenuse may be longer than a core width of the core 310 along any of the first perpendicular axis 326B and the second perpendicular axis 326C. Accordingly, the zig zag boundary area 320 would be greater than a length of the folded waveguide phase shifter 308 along the extension axis 326A (e.g., as a straight line) multiplied by a core width along any perpendicular axes (e.g., as a straight line).

FIG. 4A illustrates a longitudinal cross sectional view of a light input end 404 and a light output end 406 of a folded waveguide phase shifter 408, in accordance with some embodiment. The longitudinal cross sectional view of a longitudinal cross section may span from the light input end 404 to the light output end 406. The folded waveguide phase shifter 408 may include a core 410 and a cladding 412. The core 410 may be the part of the folded waveguide phase shifter 408 in which light may propagate through from the light input end 404 to the light output end 406.

FIG. 4B illustrates a longitudinal cross sectional view of a circular boundary area 420, in accordance with some embodiments. The circular boundary area 420 may be between a first type of semiconductor material 422A and a second type of semiconductor material 422B. In certain embodiments, the first type of semiconductor material 422A may be a p-type semiconductor material while the second type of semiconductor material 422B may be an n-type semiconductor material. However, in other embodiments, the first type of semiconductor material 422A may be an n-type semiconductor material while the second type of semiconductor material 422B may be a p-type semiconductor material.

The circular boundary area 420 may be greater than a length of the folded waveguide phase shifter 408 along an extension axis 426A (e.g., an axis along which the light substantially propagates from a light input end to a light output end) multiplied by a core width of the core 410 along any possible perpendicular axes (e.g., an axis perpendicular to the extension axis that may be combined with the extension axis to form an area). The extension axis may also be referenced as a Z axis. In certain embodiments with two core widths along respective axes, one of the core widths along one axis perpendicular to the extension axis may be referred to as a core width while the other of the core widths along another axis perpendicular to the extension axis may be referred to as a core height. When the core 410 of the folded waveguide phase shifter 408 is in the shape of a rectangular bar, the perpendicular axis may be broken up into a first perpendicular axis 426B (e.g., referenced as an X axis) and a second perpendicular axis (e.g., referenced as a Y axis). When the core 410 of the folded waveguide phase shifter 408 is in the shape of a cylinder, the perpendicular axis or may be along a diameter perpendicular to the extension axis 426A.

The circular boundary area 420 may be increased by adopting various folds or patterns of discrete shapes for the boundary from the light input end 404 to the light output end 406 of the folded waveguide phase shifter 408. For example, the circular boundary area 420 may propagate with discrete circular shapes along the extension axis 426A. The circular boundary area 420, as discrete circumferences of respective discrete circles, may be of a dimension to have a greater length than a length of a line from the light input end 404 to the light output end 406 of the core 410 along the extension axis 426A. Accordingly, for a same core width along any possible perpendicular axes, the circular boundary area 420 may be greater than a length of the folded waveguide phase shifter 408 along the extension axis 426A (e.g., as a straight line) multiplied by a core width along any possible perpendicular axes (e.g., as a straight line).

Figure 4C:
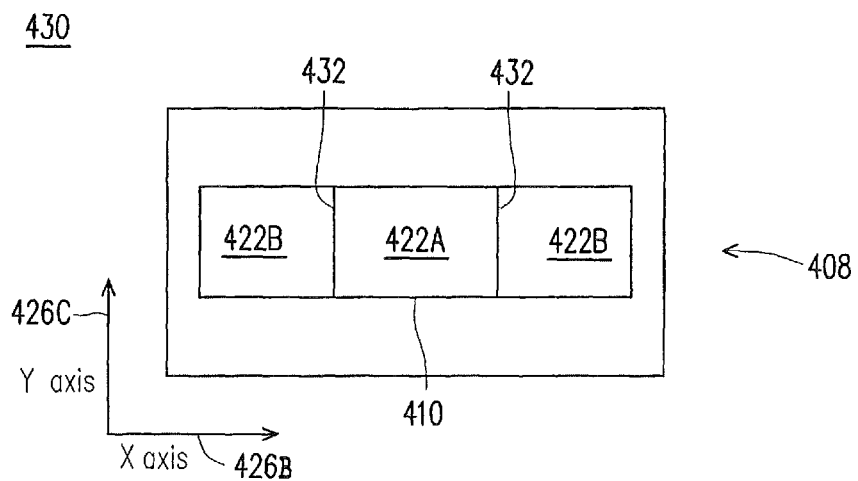
FIG. 4C illustrates a lateral cross sectional view of the circular boundary area that forms a cylinder across line B-B of FIG. 4B, in accordance with some embodiments.

FIG. 4C illustrates a lateral cross sectional view 430 of the circular boundary area that forms a cylinder 432 across line B-B of FIG. 4B, in accordance with some embodiments. The lateral cross sectional view 430 may be of a cross section that would not include the light input end and/or the light output end. Stated another way, the lateral cross sectional view may be a view perpendicular to a longitudinal cross sectional view. The circular boundary area that forms a cylinder 432 may be greater than a length of the folded waveguide phase shifter 408 along the extension axis multiplied by a core width of the core 410 along any possible perpendicular axes. In certain embodiments with two core widths along respective axes, one of the core widths along one axis perpendicular to the extension axis may be referred to as a core width while the other of the core widths along another axis perpendicular to the extension axis may be referred to as a core height. The possible perpendicular axes may include the first perpendicular axis 426B (e.g., referenced as an X axis) and a second perpendicular axis 426C (e.g., referenced as a Y axis).

The circular boundary area that forms a cylinder 432 may extend fully along the second perpendicular axis 426C within the core 410. Stated another way, the circular boundary area that is shaped with discrete circular shapes in the longitudinal cross sectional view as illustrated in FIG. 4B, and that extends fully along the second perpendicular axis in the lateral cross sectional view 430 of FIG. 4C would form the circular boundary area that forms a cylinder 432 when visualized in three dimensional space.

Figure 4D:
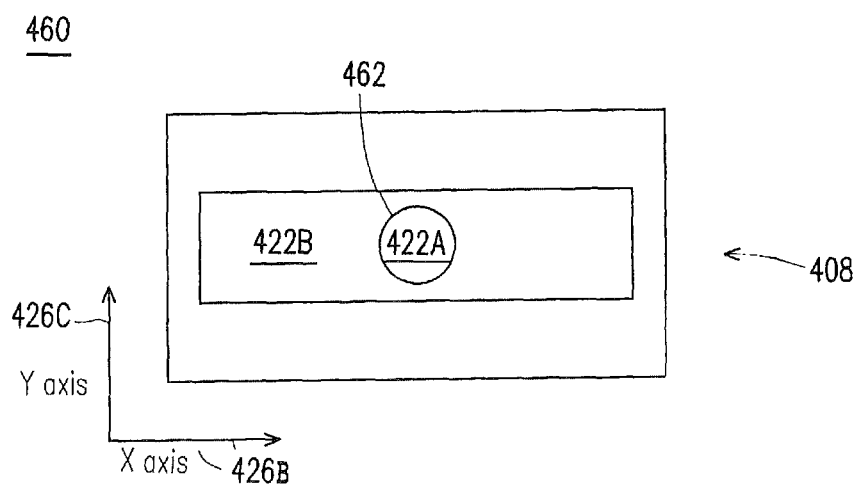
FIG. 4D illustrates a lateral cross sectional view of the circular boundary area that forms a sphere, in accordance with some embodiments.

FIG. 4D illustrates a lateral cross sectional view 460 of the circular boundary area that forms a sphere 462, in accordance with some embodiments. The circular boundary area that forms a sphere 462 may be greater than a length of the folded waveguide phase shifter 408 along the extension axis multiplied by a core width of the core 410 along any possible perpendicular axes. In certain embodiments with two core widths along respective axes, one of the core widths along one axis perpendicular to the extension axis may be referred to as a core width while the other of the core widths along another axis perpendicular to the extension axis may be referred to as a core height. The possible perpendicular axes may include the first perpendicular axis 426B (e.g., referenced as an X axis) and a second perpendicular axis 426C (e.g., referenced as a Y axis).

The circular boundary area that forms a sphere 462 may be a circle in the lateral cross sectional view 460 within the core 410. Stated another way, the circular boundary area that is shaped with discrete circular shapes in the longitudinal cross sectional view as illustrated in FIG. 4B, and that forms a circle in the lateral cross sectional view 460 of FIG. 4D would form the circular boundary area that forms a sphere 462 when visualized in three dimensional space.

Figure 4E:
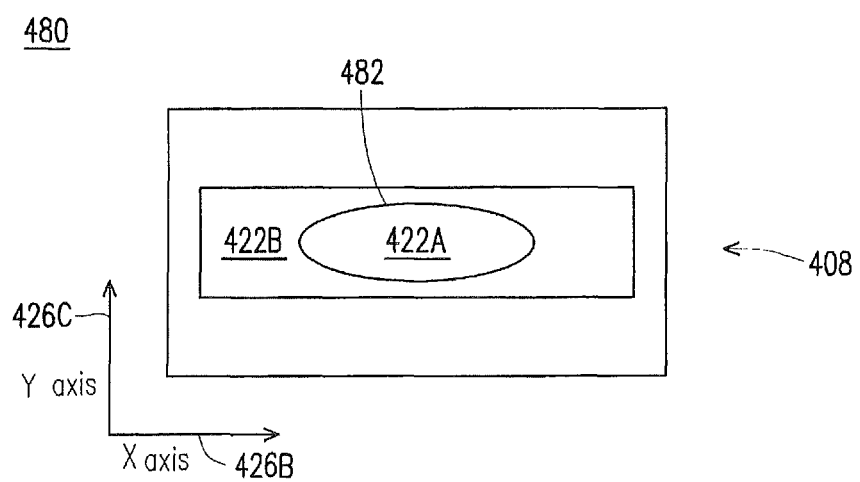
FIG. 4E illustrates a lateral cross sectional view of the circular boundary area that forms an elliptical sphere, in accordance with some embodiments.

FIG. 4E illustrates a lateral cross sectional view 480 of the circular boundary area that forms an elliptical sphere 482, in accordance with some embodiments. The circular boundary area that forms an elliptical sphere 482 may be greater than a length of the folded waveguide phase shifter 408 along the extension axis multiplied by a core width of the core 410 along any possible perpendicular axes. In certain embodiments with two core widths along respective axes, one of the core widths along one axis perpendicular to the extension axis may be referred to as a core width while the other of the core widths along another axis perpendicular to the extension axis may be referred to as a core height. The possible perpendicular axes may include the first perpendicular axis 426B (e.g., referenced as an X axis) and a second perpendicular axis 426C (e.g., referenced as a Y axis).

The circular boundary area that forms an elliptical sphere 482 may be an ellipse in the lateral cross sectional view 480 within the core 410. Stated another way, the circular boundary area that is shaped with discrete circular shapes in the longitudinal cross sectional view as illustrated in FIG. 4B, and that forms an ellipse in the lateral cross sectional view 480 of FIG. 4E would form the circular boundary area that forms an elliptical sphere 482 when visualized in three dimensional space.

FIG. 5A illustrates a longitudinal cross sectional view of a light input end 504 and a light output end 506 of a folded waveguide phase shifter 508, in accordance with some embodiments. The longitudinal cross sectional view may span a longitudinal cross section from the light input end 504 to the light output end 506. The folded waveguide phase shifter 508 may include a core 510 and a cladding 512. The core 510 may be the part of the folded waveguide phase shifter 508 in which light may propagate through from the light input end 504 to the light output end 506.

FIG. 5B illustrates a longitudinal cross sectional view of a multi-pointed star boundary area 520, in accordance with some embodiment. The multi-pointed star boundary area 520 may be between a first type of semiconductor material 522A and a second type of semiconductor material 522B. In certain embodiments, the first type of semiconductor material 522A may be a p-type semiconductor material while the second type of semiconductor material 522B may be an n-type semiconductor material. However, in other embodiments, the first type of semiconductor material 522A may be an n-type semiconductor material while the second type of semiconductor material 522B may be a p-type semiconductor material.

The multi-pointed star boundary area 520 may be greater than a length of the folded waveguide phase shifter 508 along an extension axis 526A (e.g., an axis along which the light substantially propagates from a light input end to a light output end) multiplied by a core width of the core 510 along any possible perpendicular axes (e.g., an axis perpendicular to the extension axis that may be combined with the extension axis to form an area). The extension axis may also be referenced as a Z axis. In certain embodiments with two core widths along respective axes, one of the core widths along one axis perpendicular to the extension axis may be referred to as a core width while the other of the core widths along another axis perpendicular to the extension axis may be referred to as a core height. When the core 510 of the folded waveguide phase shifter 508 is in the shape of a rectangular bar, the perpendicular axis may be broken up into a first perpendicular axis 526B (e.g., referenced as an X axis) and a second perpendicular axis (e.g., referenced as a Y axis). When the core 510 of the folded waveguide phase shifter 508 is in the shape of a cylinder, the perpendicular axis or may be along a diameter perpendicular to the extension axis 526A.

The multi-pointed star boundary area 520 may be increased by adopting various folds or patterns of discrete shapes for the boundary from the light input end 504 to the light output end 506 of the folded waveguide phase shifter 508. For example, the multi-pointed star boundary area 520 may propagate with discrete multi-pointed star shapes along the extension axis 526A. The multi-pointed star boundary area 520, as discrete perimeters of respective discrete multi-pointed stars, may be of a dimension to have a greater length than a length of a line from the light input end 504 to the light output end 506 of the core 510 along the extension axis 526A. Accordingly, for a same core width along any possible perpendicular axes, the multi-pointed star boundary area 520 may be greater than a length of the folded waveguide phase shifter 508 along the extension axis 526A (e.g., as a straight line) multiplied by a core width along any possible perpendicular axes (e.g., as a straight line).

Figure 5C:
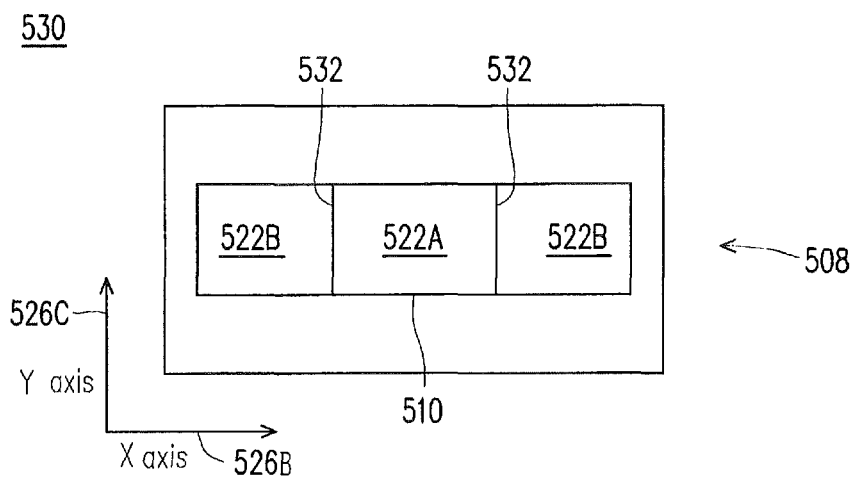
FIG. 5C illustrates a lateral cross sectional view of the multi-pointed star boundary area that forms a multi-pointed star cylinder across line C-C of FIG. 5B, in accordance with some embodiments.

FIG. 5C illustrates a lateral cross sectional view 530 of the multi-pointed star boundary area that forms a multi-pointed star cylinder 532 across line C-C of FIG. 5B, in accordance with some embodiments. The multi-pointed star boundary area that forms a multi-pointed star cylinder 532 may have more than three faces (e.g., flat surfaces). The lateral cross sectional view 530 may be of a cross section that would not include the light input end and/or the light output end. Stated another way, the lateral cross sectional view may be a view perpendicular to a longitudinal cross sectional view. The multi-pointed star boundary area that forms a multi-pointed star cylinder 532 may be greater than a length of the folded waveguide phase shifter 508 along the extension axis multiplied by a core width of the core 510 along any possible perpendicular axes. In certain embodiments with two core widths along respective axes, one of the core widths along one axis perpendicular to the extension axis may be referred to as a core width while the other of the core widths along another axis perpendicular to the extension axis may be referred to as a core height. The possible perpendicular axes may include the first perpendicular axis 526B (e.g., referenced as an X axis) and a second perpendicular axis 526C (e.g., referenced as a Y axis).

The multi-pointed star boundary area that forms a multi-pointed star cylinder 532 may extend fully along the second perpendicular axis 526C within the core 510. Stated another way, the multi-pointed star boundary area that is shaped with discrete multi-pointed star shapes in the longitudinal cross sectional view as illustrated in FIG. 5B, and that extends fully along the second perpendicular axis in the lateral cross sectional view 530 of FIG. 5C would form the multi-pointed star boundary area that forms a multi-pointed star cylinder 532 when visualized in three dimensional space.

Figure 5D:
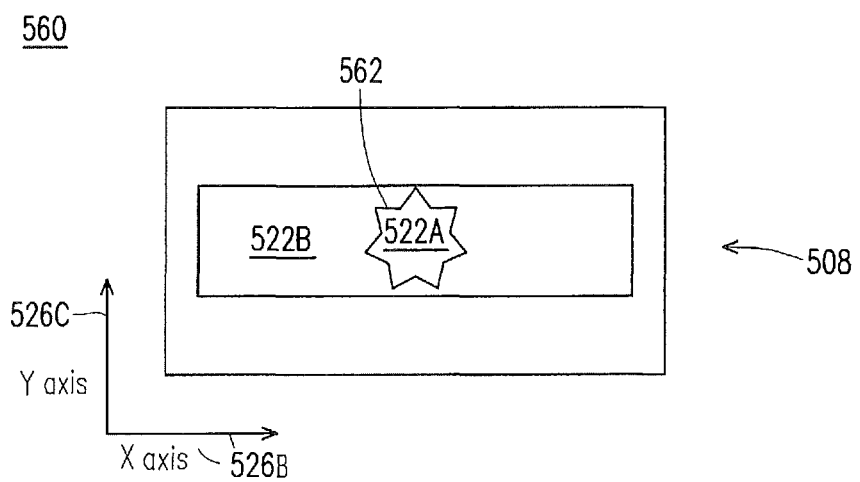
FIG. 5D illustrates a lateral cross sectional view of the multi-pointed star boundary area that forms a three dimensional multi-pointed star, in accordance with some embodiments.

FIG. 5D illustrates a lateral cross sectional view 560 of the multi-pointed star boundary area that forms a three dimensional multi-pointed star 562, in accordance with some embodiments. The lateral cross sectional view 560 may be of a cross section that would not include the light input end and/or the light output end. Stated another way, the lateral cross sectional view may be a view perpendicular to a longitudinal cross sectional view. The multi-pointed star boundary area that forms a three dimensional multi-pointed star 562 may be greater than a length of the folded waveguide phase shifter 508 along the extension axis multiplied by a core width of the core 510 along any possible perpendicular axes. In certain embodiments with two core widths along respective axes, one of the core widths along one axis perpendicular to the extension axis may be referred to as a core width while the other of the core widths along another axis perpendicular to the extension axis may be referred to as a core height. The possible perpendicular axes may include the first perpendicular axis 526B (e.g., referenced as an X axis) and a second perpendicular axis 526C (e.g., referenced as a Y axis).

The multi-pointed star boundary area that forms a three dimensional multi-pointed star 562 may be a multi-pointed star in the lateral cross sectional view 560 within the core 510. Stated another way, the multi-pointed star boundary area that is shaped with discrete multi-pointed star shapes in the longitudinal cross sectional view as illustrated in FIG. 5B, and that forms a multi-pointed star in the lateral cross sectional view 560 of FIG. 5D would form the multi-pointed star boundary area that forms a three dimensional multi-pointed star 562 when visualized in three dimensional space.

Figure 6:
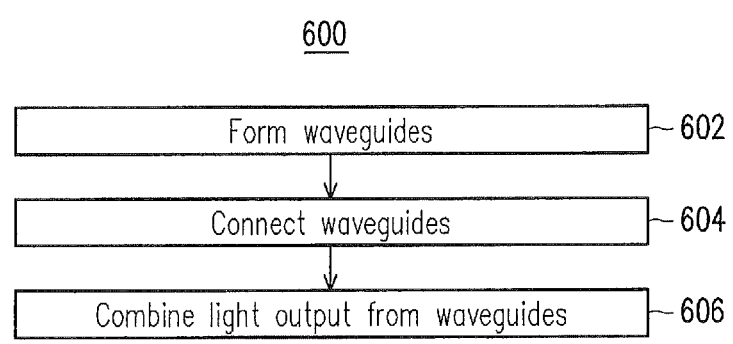
FIG. 6 is a flow chart of a folded waveguide phase shifter modulator assembly process, in accordance with some embodiments.

FIG. 6 is a flow chart of a folded waveguide phase shifter modulator assembly process 600, in accordance with some embodiments. It is noted that the process 600 is merely an example, and is not intended to limit the present disclosure. Accordingly, it is understood that additional operations may be provided before, during, and after the process 600 of FIG. 6, certain operations may be omitted, certain operations may be performed concurrently with other operations, and that some other operations may only be briefly described herein.

At operation 602, a folded waveguide phase shifter may be formed. As noted above, a folded waveguide phase shifter may have an increased boundary area between p-type semiconductor materials and n-type semiconductor materials. This increased boundary area may be increased from merely having the boundary area be equal to a length from a light input end to a light output end multiplied by a core width of a waveguide phase shifter. Accordingly, the increased boundary may be folded in that the boundary is not present in only a straight line but includes at least one fold or nonlinear transition. For example, the boundary area may be increased by adopting various two dimensional and/or three dimensional folds that make patterns for the boundary. These patterns may include, for example, diagonals, triangles, arcs, circles, rectangles (e.g., blocks), squares, spheres, cylinders, and/or any other type of pattern that may be adopted to increase the boundary area between the n-type semiconductor material and the p-type semiconductor material. In particular embodiments, these patterns may form discrete shapes from a light input end to a light output end of the waveguide.

At operation 604, the folded waveguide phase shifter may be connected with components of a modulator. As noted above, a modulator may cause a light beam to be split such that a first portion of the light beam is directed through one arm of the modulator and a second portion of light beam is directed through another arm of the modulator. At least one of the arms of the modulator may include (e.g., be connected with) the folded waveguide phase shifter, which performs a phase shift.

In one embodiment, only one of the arms of the modulator includes the folded waveguide phase shifter. In another embodiment, both of the arms of the modulator may include different folded waveguide phase shifters, such as different folded waveguide phase shifters with different types of boundary areas or a same type of boundary area but that extends for different lengths.

At operation 606, light output from the waveguides of the modulator, including the folded waveguide phase shifter, may be combined. For example, the first and second portions of the light beam mentioned in operation 604 are merged such that the light beam is modulated at the output of the modulator as a result of constructive or destructive interference.

In an embodiment, a phase shifter includes: a light input end; a light output end; a p-type semiconductor material, and an n-type semiconductor material contacting the p-type semiconductor material along a boundary area, wherein the boundary area is greater than a length from the light input end to the light output end multiplied by a core width of the phase shifter. In an embodiment, the boundary area zig zags from the light input end to the light output end. In another embodiment, the boundary area extends from one end of the core width of the phase shifter to a second end of the core width of the phase shifter. In another embodiment, the phase shifter comprises a core height perpendicular to the core width of the phase shifter, where the boundary area extends from one end of the core height of the phase shifter to a second end of the core height of the phase shifter. In another embodiment, the boundary area extends from one end of the core width of the phase shifter to a second end of the core width of the phase shifter. In another embodiment, the boundary area forms discrete shapes from the light input end to the light output end. In another embodiment, the discrete shapes are spheres. In another embodiment, the discrete shapes are cylinders.

In an embodiment, a modulator includes: a first waveguide; and a second waveguide, comprising: a light input end, a light output end, a p-type semiconductor material, and an n-type semiconductor material contacting the p-type semiconductor material along a boundary area, wherein the boundary area is greater than a length from the light input end to the light output end multiplied by a core width of the second waveguide, wherein the first waveguide is different than the second waveguide, wherein a first light output of the first waveguide is combined with a second light output from the light output end. In another embodiment, the boundary area forms cylinders with more than 3 faces (e.g., flat surfaces) from the light input end to the light output end. In another embodiment, the boundary area forms rectangular blocks from the light input end to the light output end. In another embodiment, the light output end is coupled with a memory. In another embodiment, the first waveguide and the second waveguide are part of a processor. In another embodiment, the boundary area forms multi-pointed stars from the light input end to the light output end.

In an embodiment, a method includes: connecting a first waveguide with a second waveguide different than the first waveguide, wherein the second waveguide comprises: a light input end, a light output end, a p-type semiconductor material, and an n-type semiconductor material contacting the p-type semiconductor material along a boundary area, wherein the boundary area is greater than a length from the light input end to the light output end multiplied by a core width of the second waveguide, wherein the first waveguide is different than the second waveguide; and combining a first light output of the first waveguide with a second light output from the light output end. Another embodiment includes connecting an input light source to the light input end. Another embodiment includes connecting the light input end to a first waveguide light input end. Another embodiment includes forming the boundary area with a zig zag from the light input end to the light output end. Another embodiment includes forming the boundary area with discrete shapes from the light input end to the light output end. Another embodiment includes forming the boundary area from one end of the core width of the second waveguide to a second end of the core width of the second waveguide.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A phase shifter, comprising:
   a light input end;
   a light output end;
   a first semiconductor material;
   a second semiconductor material different from the first semiconductor material, the second semiconductor material contacting the first semiconductor material along a boundary area, wherein the boundary area forms at least one discrete multi-pointed enclosed shape when viewed from a longitudinal cross sectional view extending from the light input end to the light output end, and wherein the boundary area extends from one end of a core width of the phase shifter to a second end of the core width of the phase shifter; and
   a core and a cladding, wherein the core is part of a folded waveguide phase shifter in which light may propagate through from the light input end to the light output end.

2. The phase shifter of claim 1, wherein the at least one discrete multi-pointed shape comprises at least one multi-pointed star.

3. The phase shifter of claim 2, wherein the phase shifter comprises a core height perpendicular to the core width of the phase shifter, wherein the boundary area extends from one end of the core height of the phase shifter to a second end of the core height of the phase shifter.

4. The phase shifter of claim 1, wherein the boundary area is greater than a length from the light input end to the light output end multiplied by a core width of the phase shifter.

5. The phase shifter of claim 1, wherein the core is made of silicon.

6. The phase shifter of claim 5, wherein the cladding is made of silicon oxide.

7. The phase shifter of claim 1, wherein the core comprises a material selected from: germanium (Ge), gallium arsenide (GaAs) and indium phosphide (InP).

8. The phase shifter of claim 7, wherein the cladding comprises a material selected from: germanium oxide (GeOx), silicon nitride (SiNx) and silicon-oxynitride (SiON).

9. A modulator, comprising:
   a first waveguide; and
   a second waveguide, comprising:
      a light input end,
      a light output end,
      a first semiconductor material,
      a second semiconductor material different from the first semiconductor material, the second semiconductor material contacting the first semiconductor material along a boundary area, wherein a first light output of the first waveguide is combined with a second light output from the light output end, wherein the boundary area forms a plurality of discrete multi-pointed enclosed shapes when viewed from a longitudinal cross sectional view extending from the light input end to the light output end, wherein the first waveguide and the second waveguide are part of a processor, and
      a core and a cladding, wherein the core is part of a folded waveguide phase shifter in which light may propagate through from the light input end to the light output end.

10. The modulator of claim 9, wherein each of the plurality of discrete multi-pointed shapes comprises a multi-pointed star.

11. The modulator of claim 9, wherein the boundary area is greater than a length from the light input end to the light output end multiplied by a core width of the second waveguide.

12. The modulator of claim 9, wherein the modulator comprises a Mach-Zehnder modulator that utilizes a folded waveguide phase shifter.

13. The modulator of claim 9, wherein the modulator comprises at least one of two arms optically coupled between cascaded Y-branch couplers disposed in a semiconductor material.

14. A method, comprising:
   connecting a first waveguide with a second waveguide different than the first waveguide, wherein the second waveguide comprises:
      a light input end,
      a light output end,
      a first semiconductor material, and
      a second semiconductor material, different from the first semiconductor material, the second semiconductor material contacting the first semiconductor material along a boundary area, wherein the boundary area forms a plurality of discrete multi-pointed enclosed shapes when viewed from a longitudinal cross sectional view extending from the light input end to the light output end, and wherein the first waveguide and the second waveguide are part of a processor; and
   combining a first light output of the first waveguide with a second light output from the light output end.

15. The method of claim 14, comprising:
   connecting the light input end to a first waveguide light input end.

16. The method of claim 14, wherein each of the plurality of discrete multi-pointed shapes comprises a multi-pointed star.

17. The method of claim 14, wherein the boundary area is greater than a length from the light input end to the light output end multiplied by a core width of the second waveguide.

18. The method of claim 14, comprising:
   forming the boundary area from one end of the core width of the second waveguide to a second end of a core width of the second waveguide.

19. The method of claim 14, comprising:
   connecting an input light source to the light input end.

20. The method of claim 19, wherein the boundary area is greater than a length from the light input end to the light output end multiplied by a core width of the second waveguide.

* * * * *